United States Patent
Bakhru

(10) Patent No.: US 7,602,700 B1
(45) Date of Patent: Oct. 13, 2009

(54) FAST RE-ROUTE IN IP/MPLS NETWORKS AND OTHER NETWORKS USING SONET SIGNALING

(75) Inventor: Sunil Bakhru, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 600 days.

(21) Appl. No.: 11/336,861

(22) Filed: Jan. 23, 2006

(51) Int. Cl.
*H04L 12/26* (2006.01)
(52) U.S. Cl. .................................... 370/216
(58) Field of Classification Search ................ 370/216, 370/223, 242
See application file for complete search history.

(56) References Cited

U.S. PATENT DOCUMENTS

| | | | |
|---|---|---|---|
| 7,035,262 B1* | 4/2006 | Joshi | 370/395.1 |
| 7,089,012 B2* | 8/2006 | Harris et al. | 455/445 |
| 7,212,492 B1* | 5/2007 | Au et al. | 370/229 |
| 7,260,324 B2* | 8/2007 | Passier et al. | 398/17 |
| 7,286,490 B2* | 10/2007 | Saleh et al. | 370/254 |
| 7,359,331 B2* | 4/2008 | Takamichi | 370/245 |
| 2003/0228093 A1* | 12/2003 | Notani | 385/24 |
| 2004/0160895 A1* | 8/2004 | Holmgren et al. | 370/223 |
| 2005/0185956 A1* | 8/2005 | Emongkonchai | 398/17 |

* cited by examiner

*Primary Examiner*—Derrick W Ferris
*Assistant Examiner*—Mohammad Anwar
(74) *Attorney, Agent, or Firm*—Harrity & Harrity, LLP

(57) ABSTRACT

A provider device determines that a failure has occurred in a link or path and notifies a customer device of the failure. The notifying causes the customer device to become aware of the failure in less than one second.

18 Claims, 12 Drawing Sheets

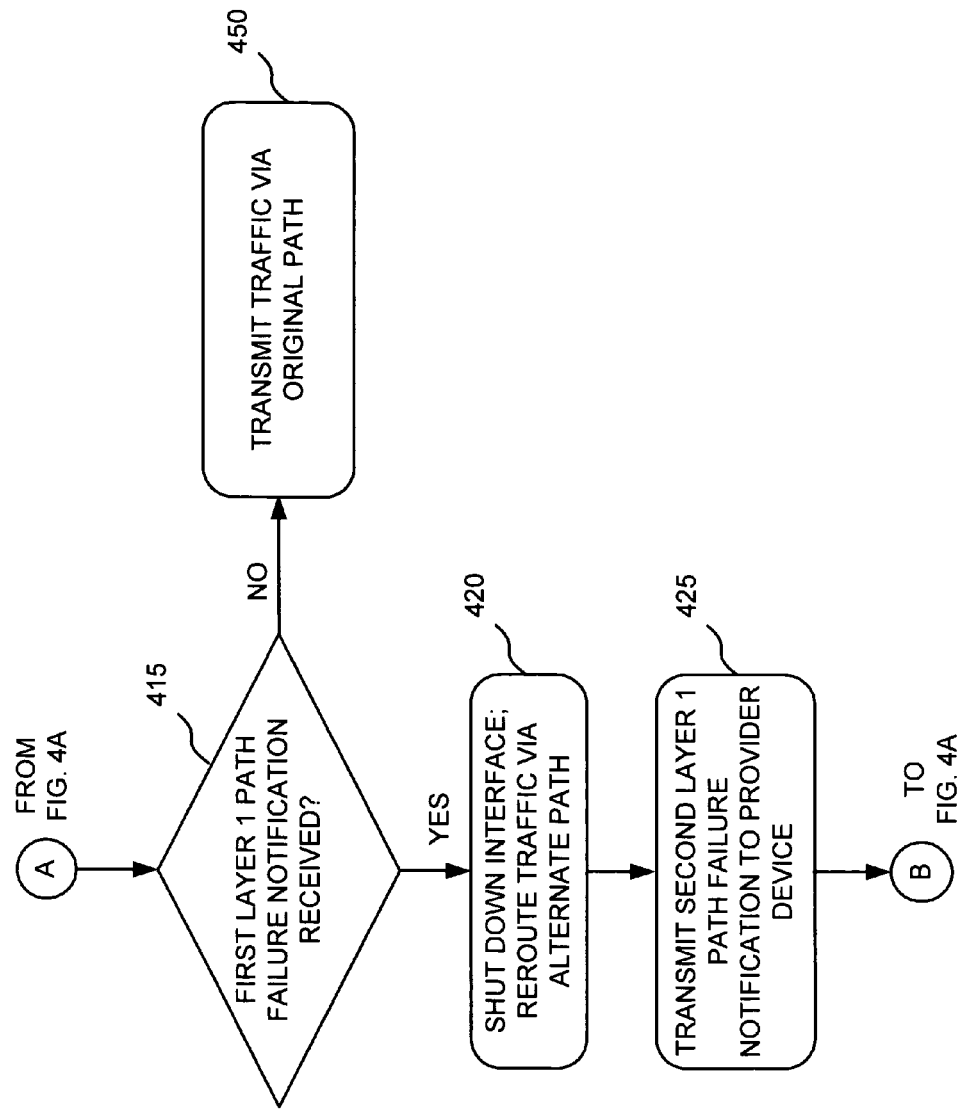

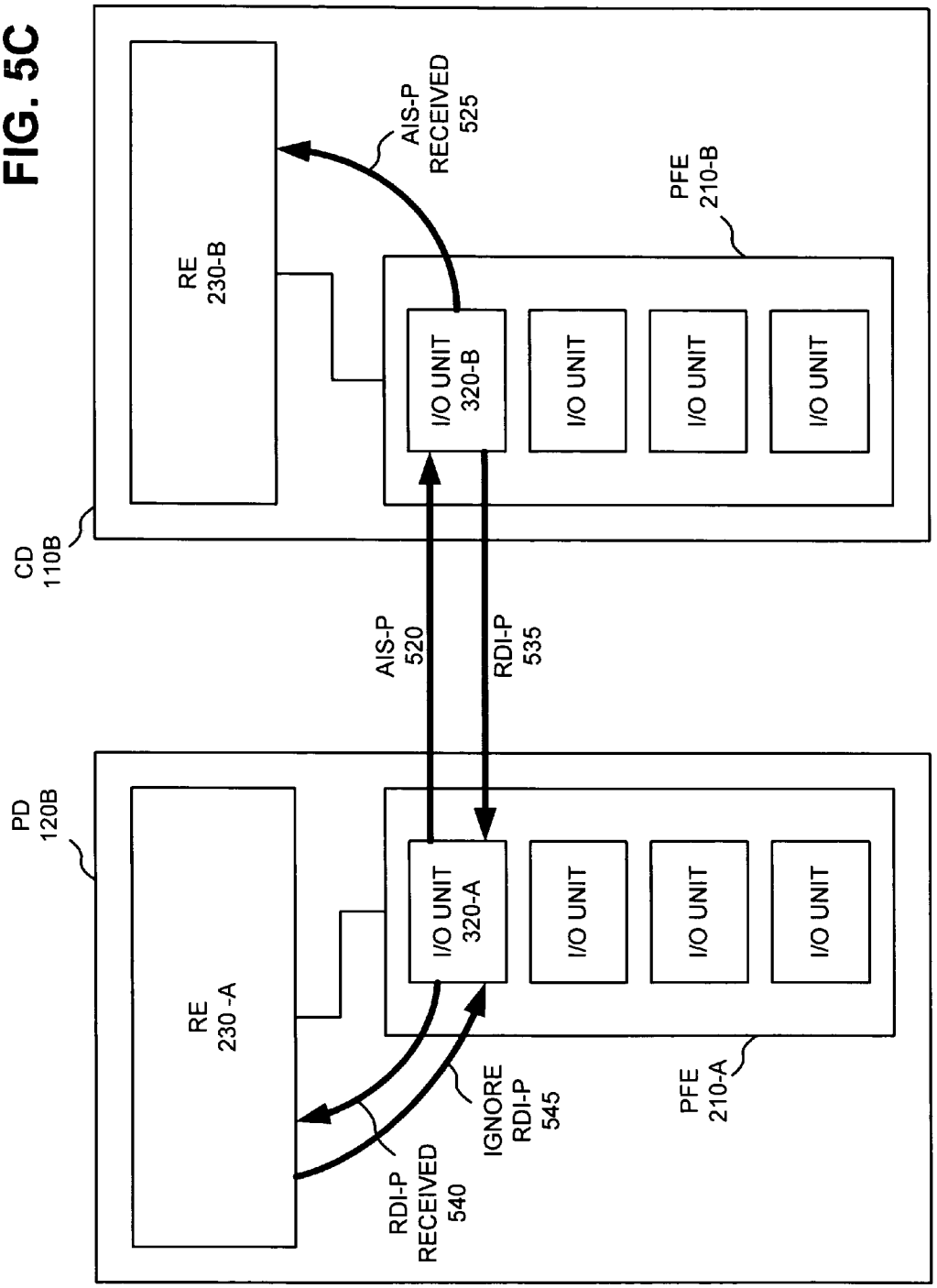

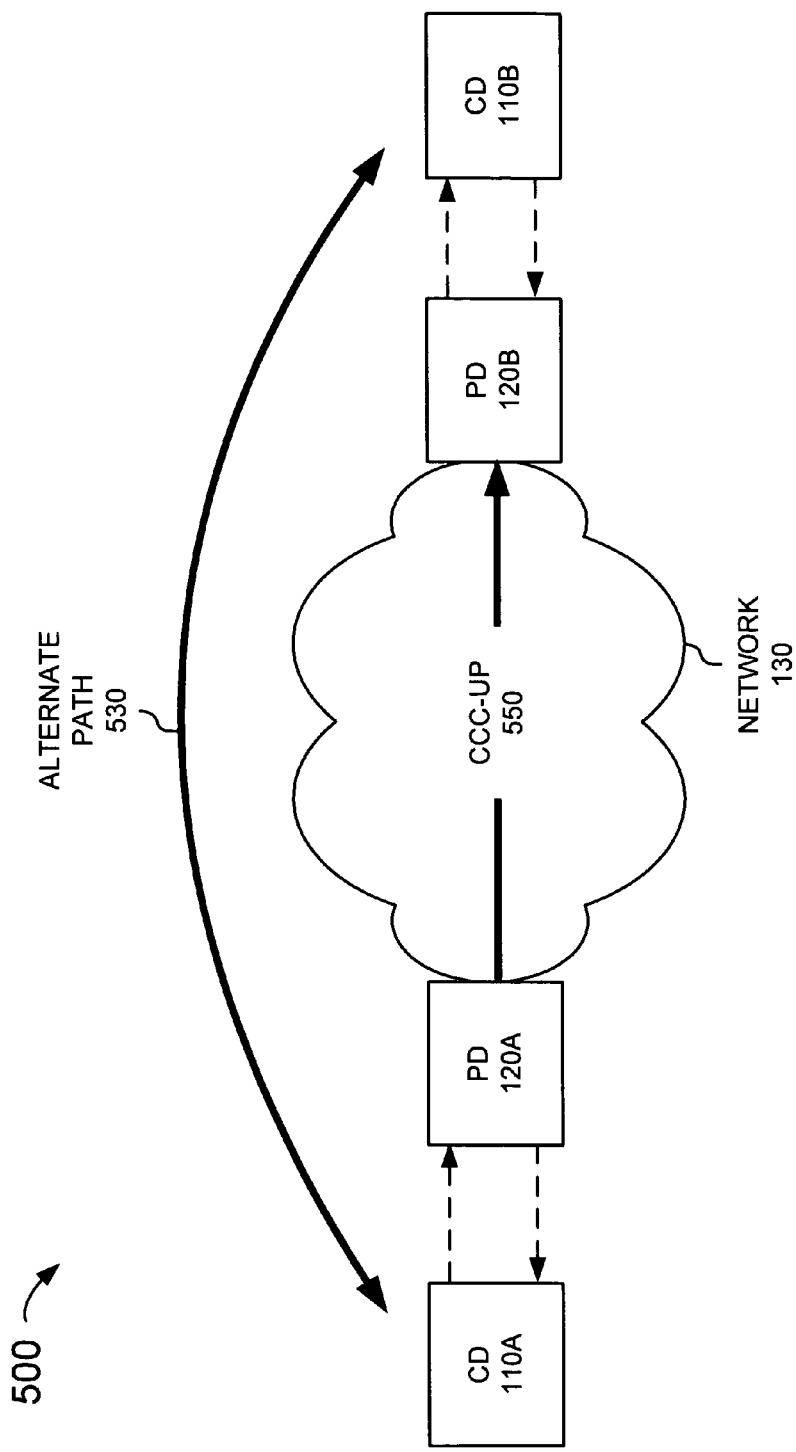

FAST RE-ROUTE IN IP/MPLS NETWORKS AND OTHER NETWORKS USING SONET SIGNALING

FIELD OF THE INVENTION

Implementations consistent with the principles of the invention relate generally to communications networks and, more particularly, to providing fast re-routing in communications networks.

BACKGROUND OF THE INVENTION

A typical communications network includes many different types of network devices. For example, a typical communications network may include host devices, which act as the source or destination of a particular flow of traffic, routers and/or switches, which act to forward traffic flows toward their appropriate destinations, and security devices, which provide, for example, firewall or other security functionality. These different types of network devices may be interconnected via links.

When a link or path in the communications network fails, it is important that re-routing around the failed link or path occurs as quickly as possible so that the loss of traffic is minimized. When the network devices are communicating via Multi-Protocol Label Switching (MPLS) using Circuit Cross-Connect technology, the network devices are notified of a failure of a link or path via layer 2 signaling, which may take up to 10 seconds for the appropriate network devices to become aware of the failure and begin re-routing traffic. When network devices are notified of a failure of a link or path via layer 3 signaling, it may take up to a minute for the appropriate network devices to become aware of the failure.

SUMMARY OF THE INVENTION

In a first implementation consistent with the principles of the invention, a method includes determining, via a provider device, that a failure has occurred in a link or path; and notifying, via the provider device, a customer device of the failure, where the customer device becomes aware of the failure in less than one second.

In another implementation consistent with the principles of the invention, a system includes a provider device and a customer device. The provider device is configured to determine that a failure has occurred in a link or path, and send a first layer 1 message in response to determining that a failure has occurred in a link or path. The customer device is configured to receive the first layer 1 message from the provider device, and transmit a second layer 1 message to the provider device in response to receiving the first layer 1 message. The second layer 1 message instructs the provider device to shut down an interface coupled to the customer device. The provider device ignores the second layer 1 message.

In still another implementation consistent with the principles of the invention, a network device includes an interface coupled to a second network device. The interface is configured to transmit a Synchronous Optical Network (SONET) alarm indication signal-path (AIS-P) signal to the second network device and receive a SONET remote defect indication-path (RDI-P) signal from the second network device after transmitting the SONET AIS-P signal. The interface ignores the SONET RDI-P signal.

In yet another implementation consistent with the principles of the invention, a method includes determining, via a first network device, that a failure has occurred in a link or path; transmitting, via the first network device, a SONET AIS-P signal to a second network device in response to the determining; receiving, via the first network device, a SONET RDI-P signal from the second network device after transmitting the SONET AIS-P signal; and ignoring the SONET RDI-P signal.

BRIEF DESCRIPTION OF THE DRAWINGS

The accompanying drawings, which are incorporated in and constitute a part of this specification, illustrate an embodiment of the invention and, together with the description, explain the invention. In the drawings.

FIGS. 4A and 4B are a flowchart of an exemplary process for re-routing traffic in the network of FIG. 1 in an implementation consistent with the principles of the invention;

FIGS. 5A-5F illustrate exemplary processing that may occur in an implementation consistent with the principles of the invention.

DETAILED DESCRIPTION

The following detailed description of implementations consistent with the principles of the invention refers to the accompanying drawings. The same reference numbers in different drawings may identify the same or similar elements. Also, the following detailed description does not limit the invention. Instead, the scope of the invention is defined by the appended claims and their equivalents.

Systems and methods consistent with the principles of the invention improve traffic re-routing in a communications network. In an exemplary implementation, layer 1 signaling (i.e., physical layer signaling) is used to notify a network device of a failure of a communications link or path. In this way, a network device may become aware of the failed link or path much quicker than previously possible, thereby allowing for re-routing of traffic to occur much more quickly.

Exemplary System

Figure 1:
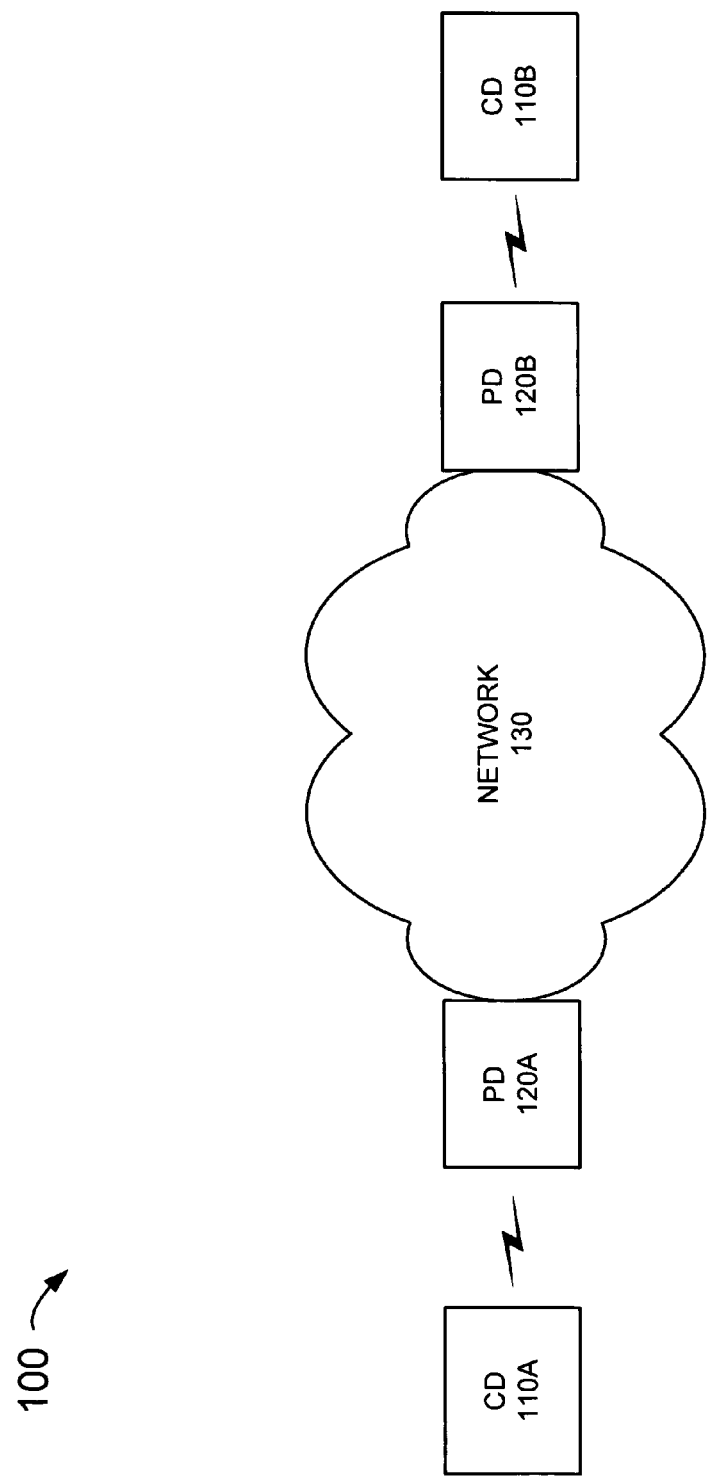
FIG. 1 is an exemplary diagram of a communications network in which systems and methods consistent with the principles of the invention may be implemented.

FIG. 1 is an exemplary diagram of a communications network 100 in which systems and methods consistent with the principles of the invention may be implemented. As illustrated, network 100 may include customer devices (CDs) 110A and 1110B (referred to collectively as "customer devices 110") that communicate via provider devices (PDs) 120A and 120B (referred to collectively as "provider devices 120"). Provider devices 120 connect via a network 130. It will be appreciated that network 100 may include other devices (not shown) that aid in receiving, processing, and/or transmitting data.

Customer devices 110 may include one or more network devices that may be associated with a customer's network. Customer devices 110 may receive data units (e.g., Internet Protocol (IP) packets) from customer equipment or provider devices 120 and forward the data units toward their destination(s). In one implementation, customer devices 110 may include customer edge routers. In one implementation consistent with the principles of the invention, customer devices 110 connect to provider devices 120 via one or more optical links. Customer devices 110 may transmit/receive data to/from provider devices 120 according to one of several protocols, such as the synchronous optical network (SONET) standard.

Provider devices 120 may include one or more network devices that may be associated with a service provider's network. Provider devices 120 may receive data units from customer devices 110 or other provider devices 120 and forward the data units toward their destination(s). In one implementation, provider devices 120 may include provider edge routers. As set forth above, provider devices 120 may transmit/receive data to/from customer devices 110 according to one of several protocols, such as the SONET standard.

Network 130 may include one or more networks capable of forwarding data units. Network 130 may include, for example, a local area network (LAN), a wide area network (WAN), a telephone network, such as the Public Switched Telephone Network (PSTN), an intranet, the Internet, or a combination of networks. In one implementation, traffic may be routed through network 130 using Multi-Protocol Label Switching (MPLS).

Figure 2:
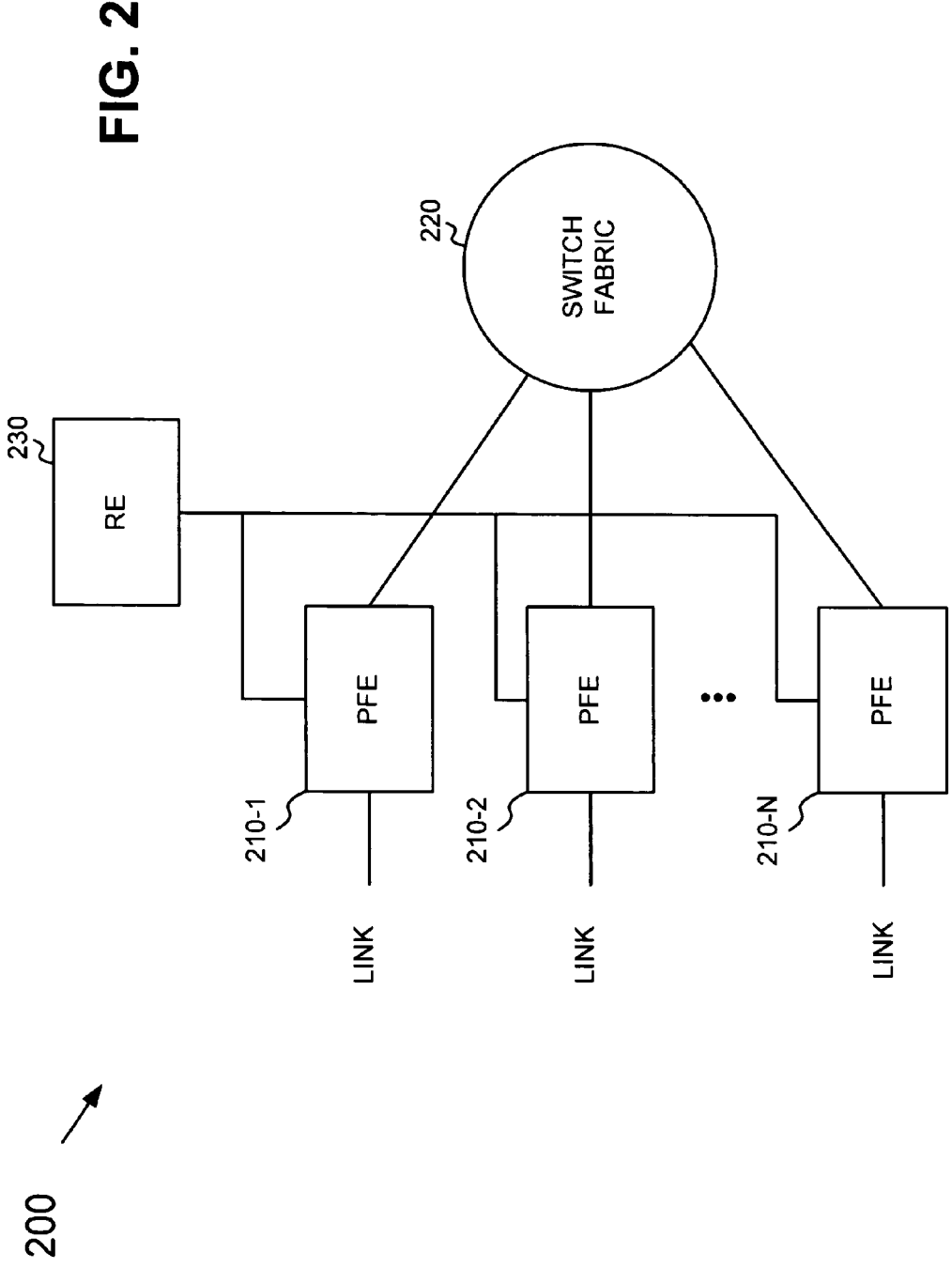
FIG. 2 is an exemplary diagram of a customer device or provider device of FIG. 1 according to an implementation consistent with the principles of the invention.

FIG. 2 is an exemplary diagram of customer device 110A, customer device 110B, provider device 120A, or provider device 120B, referred to as network device 200 in FIG. 2, according to an implementation consistent with the principles of the invention. Network device 200 may receive one or more packet streams from physical links, process the packet stream(s) to determine destination information, and transmit the packet stream(s) on links in accordance with the destination information. Network device 200 may include packet forwarding engines (PFEs) 210-1 through 210-N (collectively referred to as packet forwarding engines 210), a switch fabric 220, and a routing engine (RE) 230.

RE 230 may perform high level management functions for network device 200. For example, RE 230 may communicate with other networks and/or systems connected to network device 200 to exchange information regarding network topology. RE 230 may create routing tables based on network topology information, create forwarding tables based on the routing tables, and forward the forwarding tables to PFEs 210. PFEs 210 may use the forwarding tables to perform route lookups for incoming packets. RE 230 may also perform other general control and monitoring functions for network device 200. For example, as will be described in detail below, RE 230 may determine whether or not an interface (also referred to as an input/output (I/O) unit) is to be brought down in response to receiving a path failure notification.

PFEs 210 may each connect to RE 230 and switch fabric 220. PFEs 210 may receive packet data on physical links connected to a network, such as a wide area network (WAN), a local area network (LAN), or another type of network. Each physical link could be one of many types of transport media, such as optical fiber or Ethernet cable. The data on the physical link is formatted according to one of several protocols, such as the SONET standard, an asynchronous transfer mode (ATM) technology, or Ethernet. The data may take the form of data units, where each data unit may include all or a portion of a packet.

A PFE 210-x (where PFE 210-x refers to one of PFEs 210) may process incoming data units prior to transmitting the data units to another PFE or the network. To facilitate this processing, PFE 210-x may reassemble the data units into a packet and perform a route lookup for the packet using the forwarding table from RE 230 to determine destination information. If the destination indicates that the packet should be sent out on a physical link connected to PFE 210-x, then PFE 210-x may prepare the packet for transmission by, for example, segmenting the packet into data units, adding any necessary headers, and transmitting the data units from the port associated with the physical link.

Figure 3:
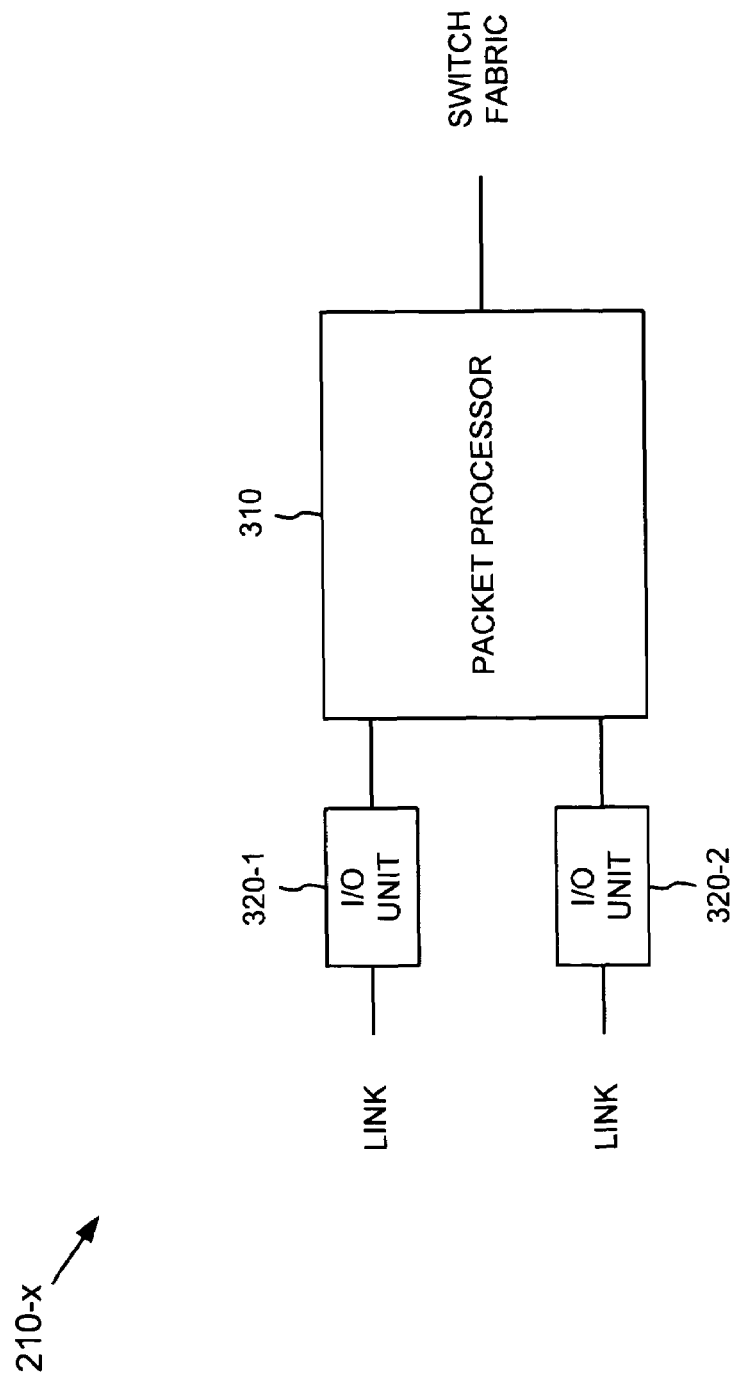
FIG. 3 is an exemplary block diagram illustrating a portion of the packet forwarding engine (PFE) of FIG. 2 according to an implementation consistent with the principles of the invention.

FIG. 3 is an exemplary block diagram illustrating a portion of PFE 210-x according to an implementation consistent with the principles of the invention. PFE 210-x may include a packet processor 310 and a set of I/O units 320-1 through 320-2 (collectively referred to as I/O units 320). Although FIG. 3 shows two I/O units 320 connected to packet processor 310, in other implementations consistent with principles of the invention, there can be more or fewer I/O units 320 and/or additional packet processors 310.

Packet processor 310 may perform routing functions and handle packet transfers to and from I/O units 320 and switch fabric 220. For each packet it handles, packet processor 310 may perform the previously-discussed route lookup function and may perform other processing-related functions.

An I/O unit 320-y (where I/O unit 320-y refers to one of I/O units 320) may operate as an interface between a physical link and packet processor 310. Different I/O units may be designed to handle different types of physical links. For example, one of I/O units 320 may be an interface for a SONET link while another one of I/O units 320 may be an interface for an Ethernet link.

Exemplary Processing

Figure 4A:
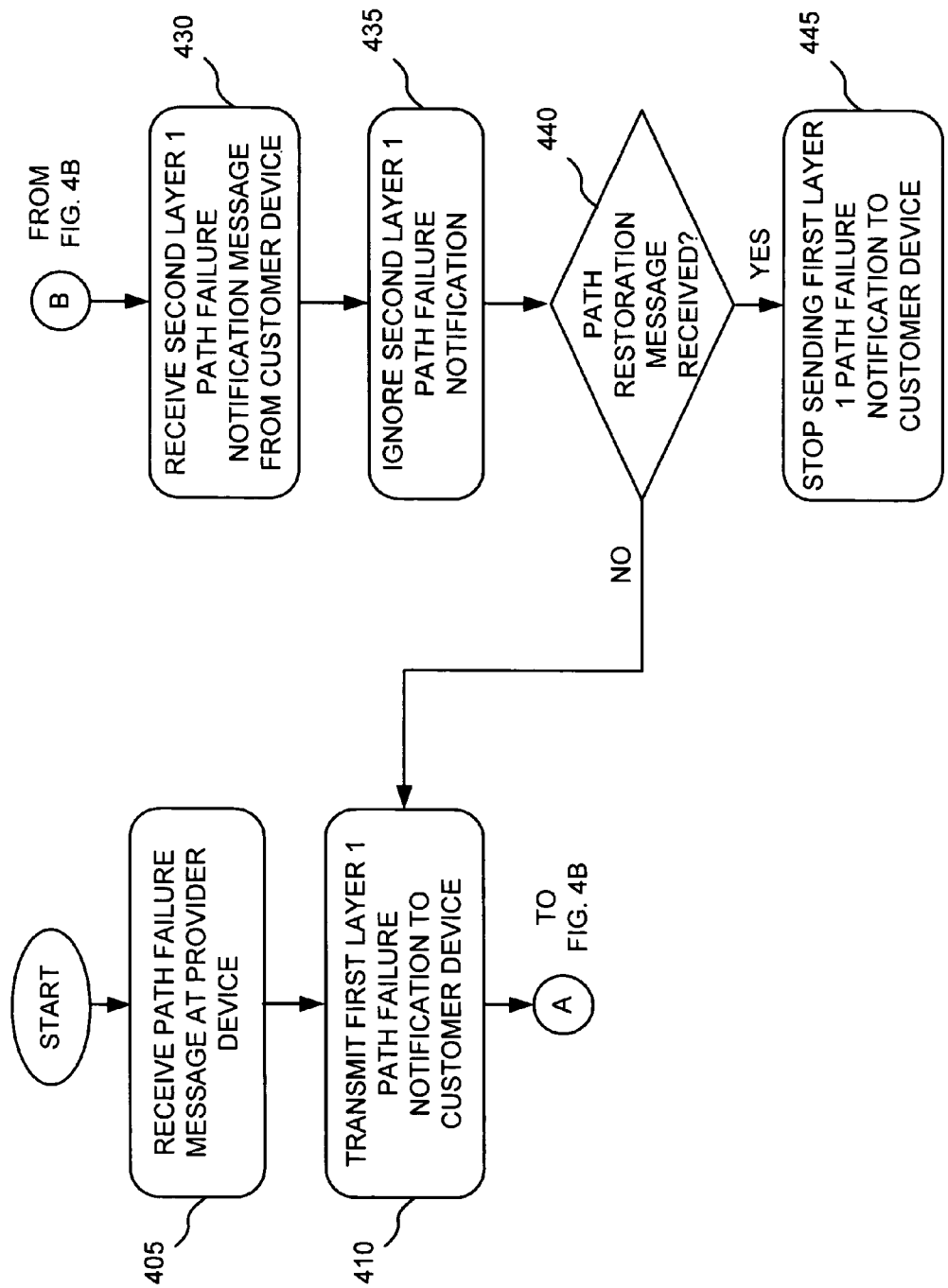

FIGS. 4A and 4B are a flowchart of an exemplary process for re-routing traffic in network 100 in an implementation consistent with the principles of the invention. For explanatory purposes, it is assumed that the processing described in relation to FIG. 4A is performed by provider device 120B and that the processing described in relation to FIG. 4B is performed by customer device 110B. The processing of FIGS. 4A and 4B will be described in connection with the exemplary network configurations illustrated in FIGS. 5A-5F.

Figure 5A:
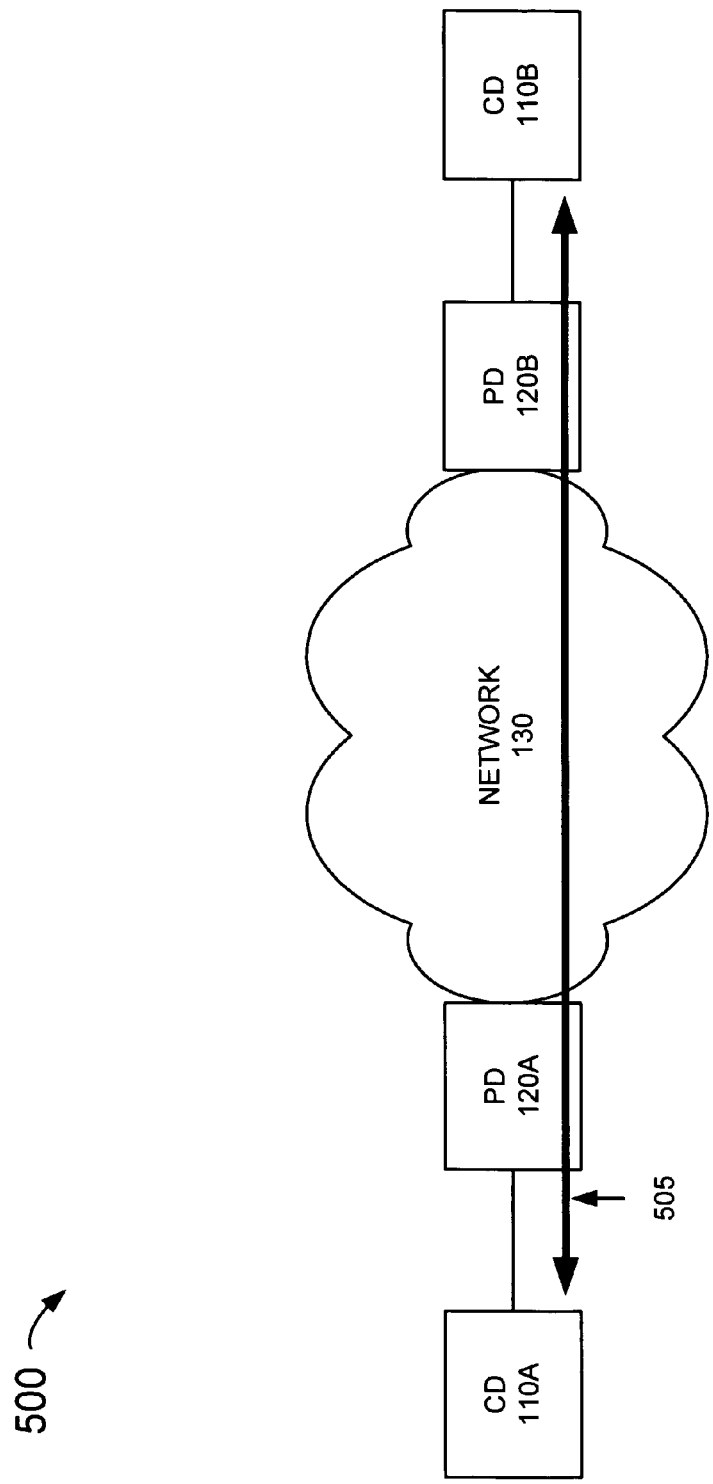

Processing may begin with customer device 110A and customer device 110B communicating via a primary path 505, as illustrated in FIG. 5A. As illustrated, customer device 110A and customer device 110B may exchange traffic via provider devices 120A and 120B and network 130.

Figure 5B:
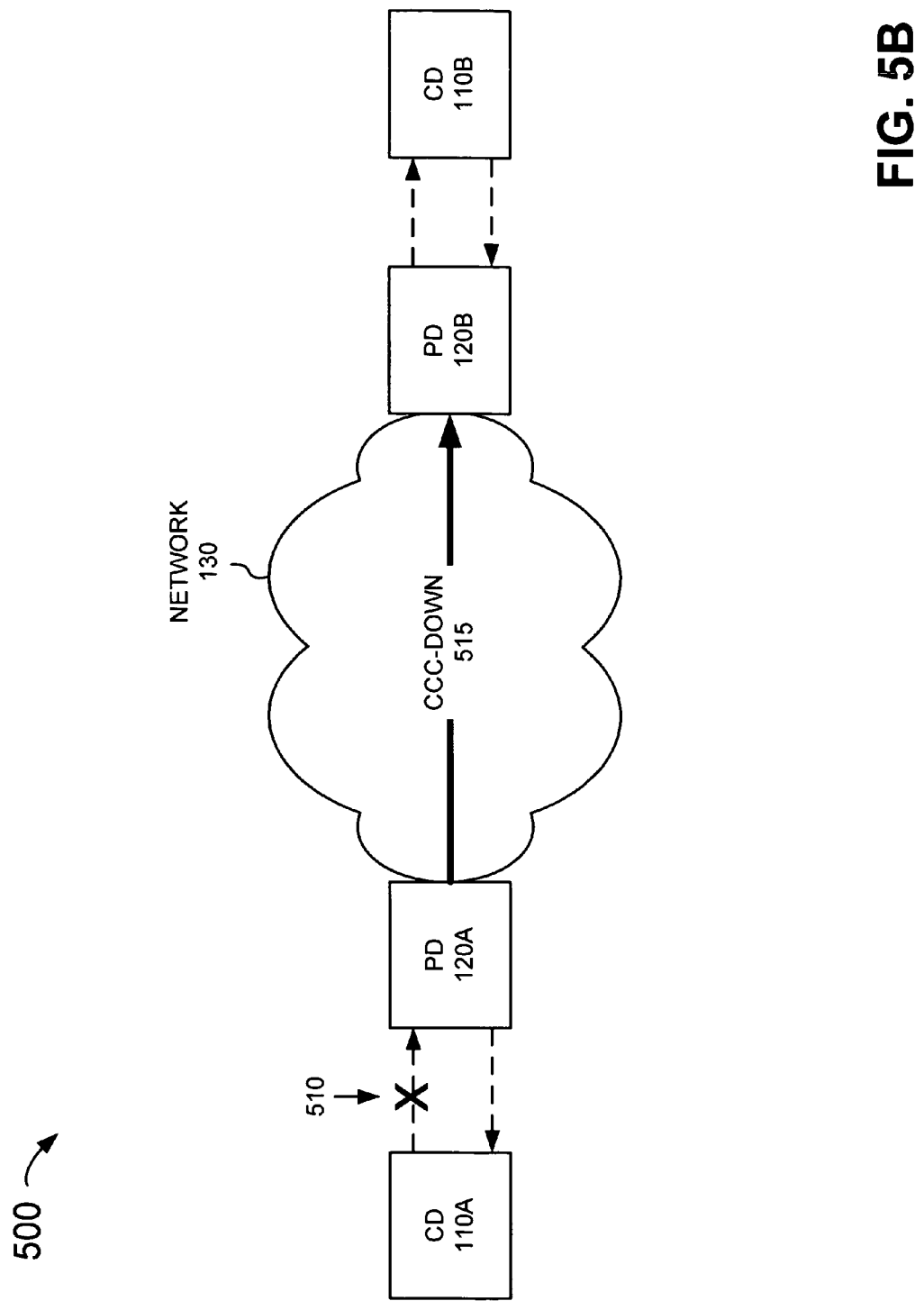

Assume that a failure 510 occurs on a path between customer device 110A and provider device 120A, as illustrated in FIG. 5B. Assume further that provider device 120A becomes aware of link failure 510. In one implementation, provider device 120A may become aware of link failure 510 when, for example, provider device 120A detects a loss of signal on the path. In response to becoming aware of link failure 510, provider device 120A may transmit a path failure notification message to provider device 120B.

In one implementation consistent with the principles of the invention, provider device 120A may transmit the path failure notification message across network 130 using the Resource Reservation Protocol (RSVP) or another protocol. The path failure notification message may include, for example, a circuit cross connect down (CCC-DOWN) message 515, as illustrated in FIG. 5B. It will be appreciated that the path failure notification message may include other types of messages.

Provider device 120B may receive the path failure notification message from provider device 120A (act 405, FIG. 4).

Provider device 120B may transmit a layer 1 path failure notification message to customer device 110B (act 410). The layer 1 path failure notification message notifies customer device 110B that a failure has occurred on the path between customer device 110A and provider device 120B. As set forth above, provider device 120B may communicate with customer device 110B using the SONET standard. In one implementation consistent with the principles of the invention, provider device 120B may transmit the layer 1 path failure notification message as an alarm indication signal-path (AIS-P) message 520, as illustrated in FIG. 5C. Assume, as illustrated in FIG. 5C, that I/O unit 320-A of provider device 120B connects to customer device 110B. Provider device 120B may also associate a trigger with I/O unit 320-A. The trigger indicates that the layer 1 path failure notification message was transmitted via that I/O unit.

By transmitting the path failure notification message at the layer 1 level, the speed at which customer device 110B is notified of the failure is greatly increased. For example, if provider device 120B transmitted the path failure notification message to customer device 110B at the layer 3 level, it may take on the order of a minute for customer device 110B to become aware of failure 510. Alternatively, if provider device 120B transmitted the path failure notification message to customer device 110B at the layer 2 level, it may take from, for example, about 13 seconds to about 30 seconds for customer device 110B to become aware of failure 510. By transmitting the path failure notification message to customer device 110B at the layer 1 level (e.g., the SONET level in the example above), it is possible for customer device 110B to become aware of failure 510 in about 110 milliseconds (up to about 1 second). In one implementation, customer device 110B may become aware of failure 510 in about 500 milliseconds. As a result, much less traffic will be lost by notifying customer device 110B at the layer 1 level.

Figure 5D:
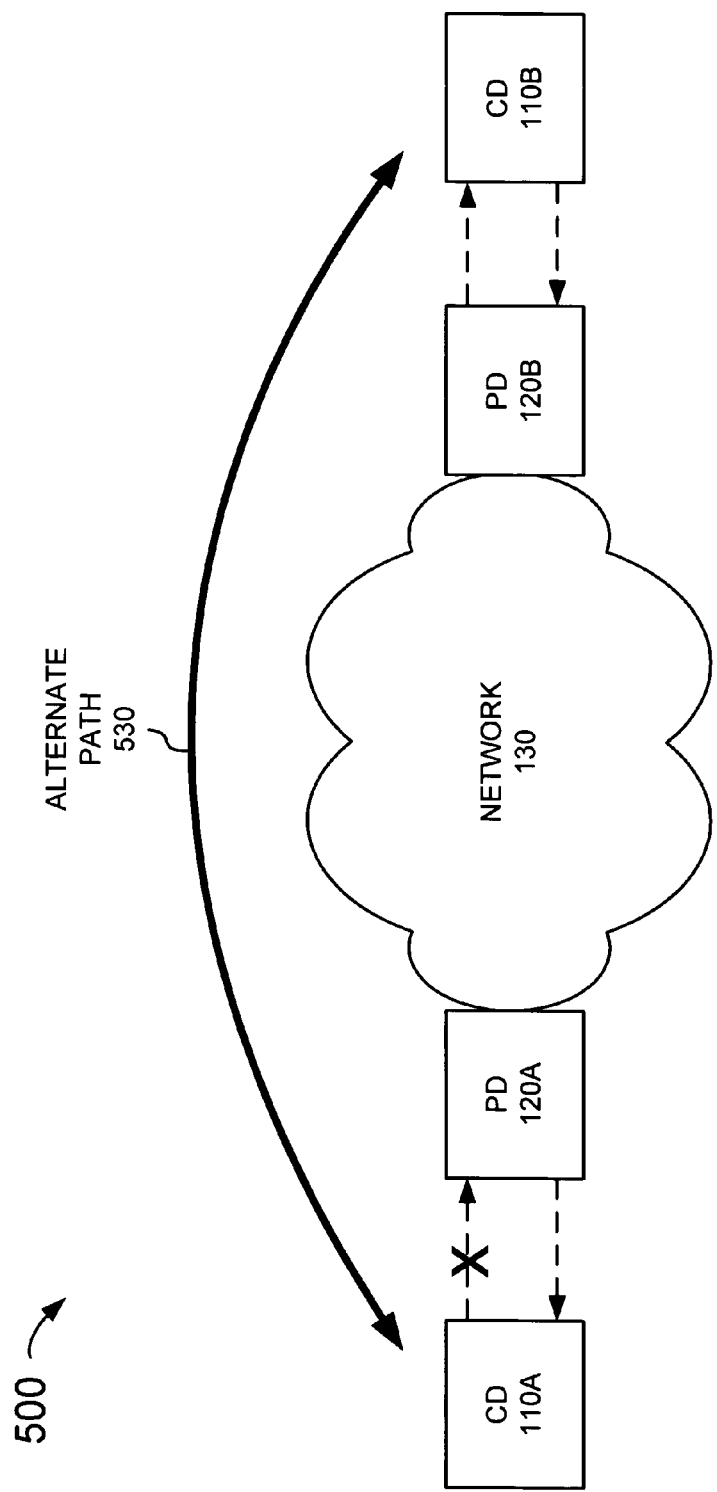

In response to receiving AIS-P message 520, customer device 110B may logically shut down the interface on which AIS-P message 520 was received (acts 415 and 420, FIG. 4B) and begin re-routing data units to customer device 110A via an alternate path (act 420). As illustrated in FIG. 5C, customer device 110B may receive AIS-P message 520 via I/O unit 320-B. I/O unit 320-B may transmit a message 525 to RE 230-B of customer device 110B indicating that AIS-P message 520 has been received and that I/O unit 320-B is shutting down. In response, RE 230-B may identify an alternate path via which customer device 110B may communicate with customer device 110A. The alternate path may be previously stored in customer device 110B or may be determined by customer device 110B in a well-known manner. Once identified, customer device 120B may begin transmitting data units via alternate path 530, as illustrated in FIG. 5D.

Returning to FIG. 5C, in response to receiving AIS-P message 520, I/O interface 320-B may transmit a layer 1 path failure notification back to provider device 120B (act 425). In one implementation consistent with the principles of the invention, customer device 110B may transmit the layer 1 path failure notification message as a remote defect indication-path (RDI-P) message 535, as illustrated in FIG. 5C.

Provider device 120B may receive RDI-P message 535 via, for example, I/O unit 320-A (act 430, FIG. 4A). In response, I/O unit 320-A may transmit a message 540 to RE 230-A of provider device 120B indicating that RDI-P message 535 has been received and that I/O unit 320-A is shutting down. Since RDI-P message 535 is in response to I/O unit 320-A transmitting an AIS-P message 520 to customer device 110B (as indicated by the trigger associated with I/O unit 320-A), RE 230-A may send a message 545 to I/O unit 320-A instructing I/O unit 320-A to ignore RDI-P message 535. In this way, I/O unit 320-A will remain up despite receiving a RDI-P message 535 that would ordinarily cause I/O unit 320-A to shut down.

When the link between customer device 110A and provider device 120A has been restored, provider device 120A may transmit a path restoration message to provider device 120B. In one implementation consistent with the principles of the invention, the path restoration message may include, for example, a CCC-UP message. It will be appreciated that the path restoration message may include other types of messages.

Provider device 120B may determine whether a path restoration message has been received from provider device 120A (act 440). If a path restoration message has not been received, processing may return to act 410 with provider device 120B transmitting another layer 1 AIS-P message to customer device 130B.

If, on the other hand, provider device 120B has received a path restoration message, as illustrated by CCC-UP message 550 in FIG. 5E, provider device 120B may stop sending layer 1 AIS-P messages 520 to customer device 110B (act 445).

Figure 5F:
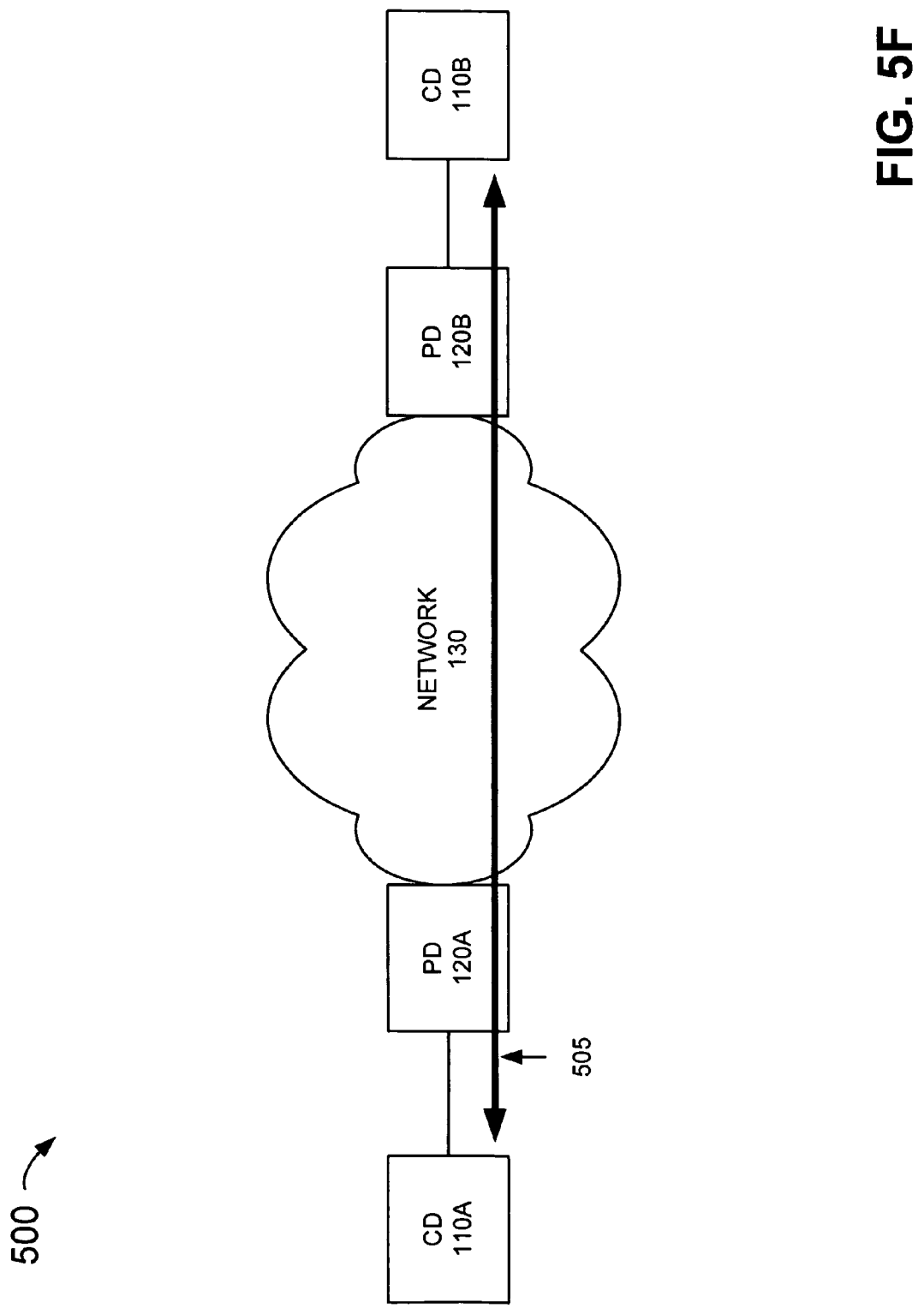

When customer device 110B determines that a layer 1 AIS-P message 520 has not been received (act 415, FIG. 4B), customer device 110B may, in one implementation consistent with the principles of the invention, begin transmitting traffic to customer device 110A on its original path 505, as illustrated in FIG. 5F. In other implementations, customer device 110B may continue transmitting traffic on alternate path 530 and use original path 505 as a backup.

Figure 6:
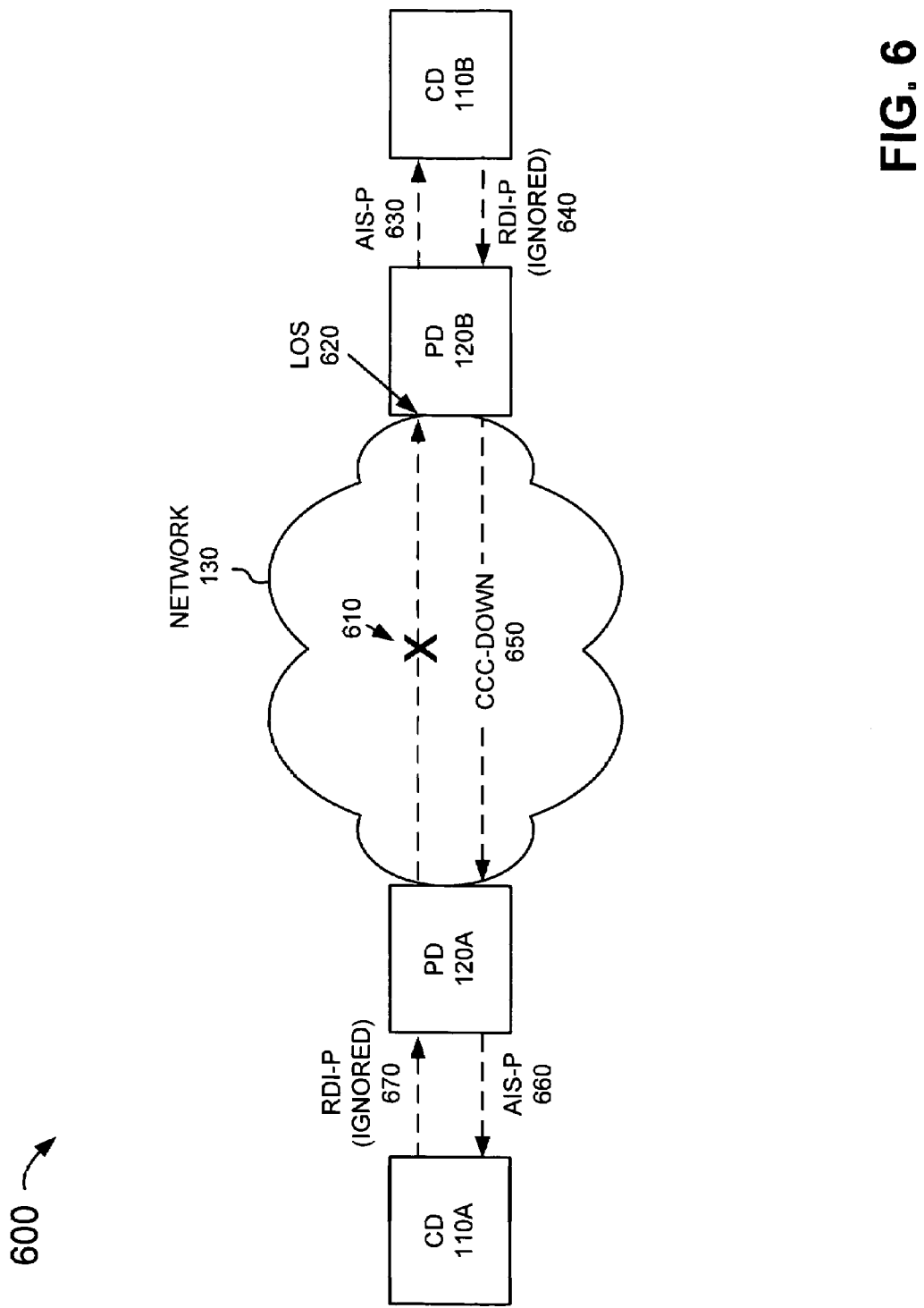
FIG. 6 illustrates exemplary alternative processing that may occur in an implementation consistent with the principles of the invention.

While the above example focused on a fault or failure occurring between a customer device and a provider device, implementations consistent with the principles of the invention are not so limited. For example, in other implementations consistent with the principles of the invention, the fault or failure may occur between two provider devices. FIG. 6 illustrates processing that may occur when the path between provider network 120A and provider network 120B fails.

Assume, as illustrated in FIG. 6, that a failure 610 has occurred along a path connecting provider device 120A to provider device 120B. Assume that provider device 120B detects failure 610 because of a loss of signal (LOS) 620 on its local interface (e.g., I/O unit). In response, provider device 120B may transmit a layer 1 AIS-P message 630 to customer device 110B to notify customer device 110B of failure 610. By using layer 1 signaling to notify customer device 110B of failure 610, customer device 110B becomes aware of failure 610 and is able to re-route traffic to customer device 110A much faster than conventional techniques (e.g., in the order of milliseconds, as compared to seconds or even minutes using layer 2 or layer 3 signaling).

Customer device 110B may transmit a layer 1 RDI-P message 640 to provider device 120B in response to receiving AIS-P message 630. RDI-P message 640 would normally cause provider device 120B's interface to customer device 110B to shut down. However, in implementations consistent with the principles of the invention, the provider device 120B keeps the interface up so that once the path between provider devices 120A and 120B comes back up, provider device 120B can report this fact to provider device 120A.

Also, in response to receiving RDI-P message 640 from customer device 110B, provider device 120B may transmit a CCC-DOWN message 650 to provider device 120A. Upon receipt of CCC-DOWN message 650, provider device 120A may transmit a layer 1 AIS-P message 660 to customer device 110A. AIS-P message 660 may cause customer device 110A to transmit a layer 1 RDI-P message 670 to provider device 120A. RDI-P message 670 would normally cause provider device 120A's interface to customer device 110A to shut down. However, in implementations consistent with the principles of the invention, provider device 120A ignores RDI-P message 670 and keeps the interface up. In this way, the appropriate interfaces of both provider devices 120A and 120B are immediately available when the failed path is restored.

CONCLUSION

Systems and methods consistent with the principles of the invention improve the re-routing of traffic in a communications network. In an exemplary implementation, customer devices are notified of link (or path) failures using layer 1 signaling. As a result, the customer devices may be notified of the failures in the order of milliseconds, which greatly decreases the amount of traffic that is lost and greatly increase the speed at which the customer devices begin re-routing traffic on alternate routes.

The foregoing description of exemplary implementations consistent with the principles of the invention provides illustration and description, but is not intended to be exhaustive or to limit the invention to the precise form disclosed. Modifications and variations are possible in light of the above teachings or may be acquired from practice of the invention. For example, while the above-description focused on SONET messaging, it will be appreciated that other layer 1 protocols can alternatively be used. Moreover, while the above description focused on using AIS-P and RDI-P signaling to notify customer devices and provider devices, respectively, of link (or path) failures, it will be appreciated that other types of signaling may alternatively be used. For example, other types of signals that may alternatively be used may include loss of frame (LOF) signaling, loss of signal (LOS) signaling, a line alarm indication signal (AIS-L), bit error rate-signal degrade (BER-SD) signaling, bit error rate-signal fault (BER-SF) signaling, loss of pointer (LOP) signaling, path unequipped (UNEQ-P) signaling, path label mismatch (PLM-P) signaling, loss of cell delineation (LOCD) signaling, etc.

While the above description focused on the transmission of signals between a customer device and a provider device, it will be appreciated that the above processing may alternatively be performed between two provider devices or even two customer devices in other implementations consistent with the principles of the invention.

While a series of acts has been described with regard to FIGS. 4A and 4B, the order of the acts may be varied in other implementations consistent with the invention. Moreover, non-dependent acts may be implemented in parallel.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects of the invention were described without reference to the specific software code—it being understood that one of ordinary skill in the art would be able to design software and control hardware to implement the aspects based on the description herein.

Further, certain portions of the invention may be implemented as "logic" that performs one or more functions. This logic may include hardware, such as an application specific integrated circuit or a field programmable gate array, software, or a combination of hardware and software.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method performed by a provider edge router within a data forwarding network, the method comprising:
   determining, via the provider edge router, that a failure has occurred in a link or path;
   and notifying, via a Synchronous Optical Network (SONET) alarm indication signal-path (AIS-P) from the provider edge router, a customer edge router outside the data forwarding network of the failure, the customer edge router becoming aware of the failure in less than one second; Receiving a Synchronous Optical Network (SONET) remote defect indication-path (RDI-P) signal from the customer edge router after notifying the customer edge router of the failure, the SONET RDI-P signal instructing the provider edge router to shut down an interface for the failed path coupled to the customer edge router; and ignoring the SONET RDI-P signal.

2. The method of claim 1 where the detecting that a the failure has occurred includes: detecting a loss of signal on the link or path.

3. The method of claim 1 where the detecting that a the failure has occurred includes: receiving a Resource Reservation Protocol (RSVP) failure notification message.

4. The method of claim 3 where the RSVP failure notification message includes an RSVP circuit cross connect-down (CCC-Down) message.

5. The method of claim 1 further comprising:
   re-routing traffic from the customer edge router to another customer router in response to the notifying.

6. The method of claim 1 where the notifying causes the customer edge router to become aware of the failure in an amount of time ranging from about 110 milliseconds to less than one second.

7. A system comprising: a provider device in a data forwarding network to: determine that a failure has occurred in a link or path, and send Synchronous Optical Network (SONET) alarm indication signal-path (AIS-P) message in response to determining that a failure has occurred in the link or path; and
   a customer device outside the data forwarding network to:
   receive the AIS-P message from the provider device, and
   transmit a SONET remote defect indication path (RDI-P) message to the provider device in response to receiving the first layer 1 (AIS-P) message, the second layer 1 (RDI-P) message instructing the provider device to shut down an interface coupled to the customer device, the provider device ignoring the RDI-P message.

8. The system of claim 7 where, when determining that a failure has occurred in the link or path, the provider device: detects a loss of signal on the link or path.

9. The system of claim 7 where, when determining that a failure has occurred in the link or path, the provider device: receives a Resource Reservation Protocol (RSVP) failure notification message.

10. The system of claim 9 where the RSVP failure notification message includes an RSVP circuit cross connect-down (CCC-Down) message.

11. The system of claim 7 where the provider device further: continues sending the AIS-P message until a path or link restoration message is received.

12. The system of claim 7 where the customer device: transmits traffic to a remote customer device via an alternate link or path in response to receiving the AIS-P message.

13. The system of claim 7 where the sending the AIS-P message to the customer device causes the customer device to become aware of the failure in less than one second.

14. A network device comprising: an interface coupled to a second network device, the interface to:
   transmit a Synchronous Optical Network (SONET) alarm indication signal-path (AIS-P) signal to the second network device; and
   receive a SONET remote defect indication-path (RDI-P) signal, to shut down the interface for the failed path, from the second network device after transmitting the SONET AIS-P signal, the interface ignoring the SONET RDI-P signal.

15. The network device of claim 14 where the network device includes a provider edge router, and where the second network device includes a customer edge router.

16. The network device of claim 14 where the interface transmits the SONET AIS-P signal to the second network device in response to the network device determining that a failure has occurred in a link or path.

17. A method comprising: determining, via a first network device, that a failure has occurred in a link or path; transmitting, via the first network device, a Synchronous Optical Network (SONET) alarm indication signal-path (AIS-P) signal to a second network device in response to the determining; receiving, via the first network device, a SONET remote defect indication-path (RDI-P) signal from the second network device after transmitting the SONET AIS-P signal, the RDI-P signal providing an indication to shut down the interface for the failed path; and ignoring the SONET RDI-P signal.

18. The method of claim 17 further comprising: repeating the transmitting, receiving, and ignoring until the failed link or path has been restored.

* * * * *